No. 733,801. PATENTED JULY 14, 1903.
J. W. BENTON.
PLANTING ATTACHMENT FOR CULTIVATORS.
APPLICATION FILED FEB. 11, 1903.
NO MODEL.
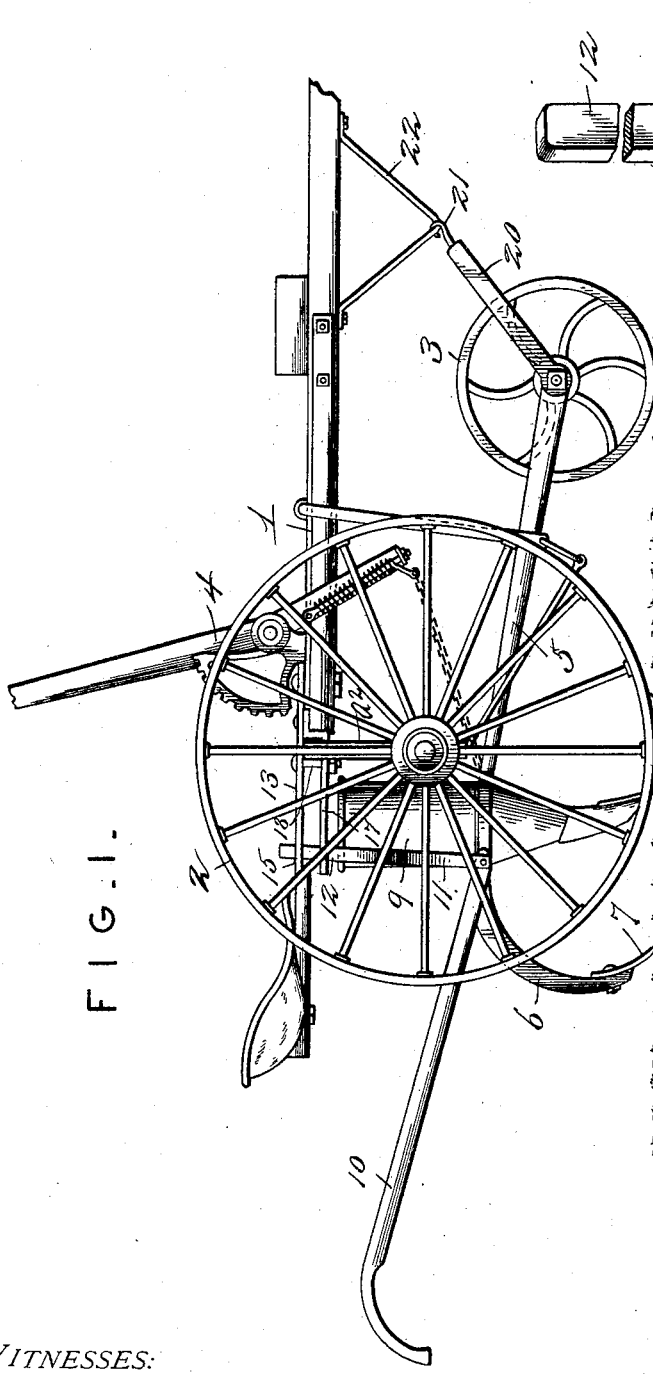
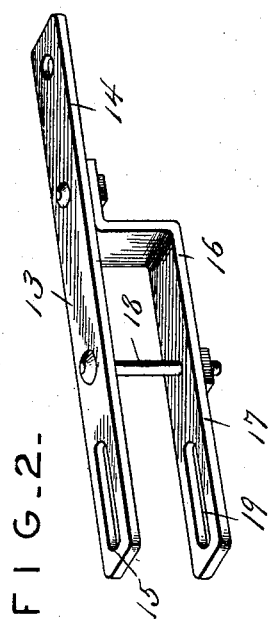
WITNESSES:
INVENTOR
John W. Benton.
BY
Victor J. Evans
Attorney No. 733,801.

Patented July 14, 1903.

UNITED STATES PATENT OFFICE.

JOHN W. BENTON, OF BOYCE, TEXAS.

PLANTING ATTACHMENT FOR CULTIVATORS.

SPECIFICATION forming part of Letters Patent No. 733,801, dated July 14, 1903.

Application filed February 11, 1903. Serial No. 142,895. (No model.)

*To all whom it may concern:*

Be it known that I, JOHN W. BENTON, a citizen of the United States, residing at Boyce, in the county of Ellis and State of Texas, have invented new and useful Improvements in Planting Attachments for Cultivators, of which the following is a specification.

This invention relates to planting attachments for cultivators.

The object of the invention is to provide a simple and effective planting attachment carried by and movable with cultivating-beams and located below a frame having ground or carrying wheels whereby the said attachment may be raised and lowered equally with the cultivating-beams and automatically moved to conform to irregularities encountered during the planting operation without liability of injuring or breaking the delivery extremity of the said planting attachment or any part thereof.

The invention consists in the construction and arrangement of the several parts, which will be more fully hereinafter described and claimed.

In the drawings, Figure 1 is a side elevation of a corn or cotton cultivator, showing the improved attachment applied thereto. Fig. 2 is a detail perspective view of a guide device for use with the planting attachment and carried by a part of the frame of the cultivator. Fig. 3 is a detail perspective view of a limiting-yoke attached to the cultivating-beams and working in the guide shown by Fig. 2.

Similar numerals of reference are employed to indicate corresponding parts in the several views.

The numeral 1 designates the frame of a corn or cotton cultivator having ground or carrying wheels 2, mounted on an arched axle $2^a$ and a front wheel 3 at the center below the frame, for obvious purposes. On the frame 1 is an adjusting-lever 4, connected to the beams 5, only one of the latter being shown by Fig. 1. It will be understood, however, that two of the beams 5 will be used and formed with rear downwardly-curved extremities 6 for the attachment of cultivating-blades or other suitable devices 7. The front ends of the beams are pivotally held on the axle of the wheel 3. The cultivator as thus far described is a well-known construction and forms no part of the present invention.

Secured to the beams 5 in rear of the axle for the wheels 2 is a planting attachment 9, consisting of one or more hoppers with outlet means. A particular construction of these planting attachments is not essential in carrying out the invention, as many forms of such attachment may be used. It is necessary, however, in the present instance to arrive at the result sought to have the planting attachment connected to and movable with the beams 5, and the latter are also attached to the adjusting means or lever 4, whereby said beams and planting attachment may be elevated and held clear of the ground-surface. The beams 5 are also provided with handles 10, so that the operator may direct and control the cultivating devices and planting attachments from the rear of the machine by hand when found necessary and desirable in performing certain planting or cultivating operations. A limiting-yoke 11 has the extremities of its arms secured to the beams 5 at the point where the handles 10 are attached to the latter, and said yoke has an upwardly-projecting center bar 12, which loosely extends through a guide 13, secured to the frame 1. This guide 13 comprises a top bar 14, bolted to the rear end of the frame 1, and having a longitudinally-disposed slot 15 in its rear extremity. An auxiliary bar 16 is disposed under and has its front angular end secured to the top bar 14 and comprises a horizontal member 17, parallel with a portion of the top bar 14 thereabove, the auxiliary bar being held in rigid spaced relation to the top bar by a bolt-rod 18, extending vertically through both bars. The upper portion of the axle $2^a$ passes through the opening between the bolt 18 and the front angular end of the auxiliary bar. The rear end of the horizontal member 17 of the bar 16 is also formed with a longitudinally-disposed slot 19, directly under and of the same length as the slot 15 in the rear end of the top bar 14. The center bar 12 of the yoke 11 loosely projects upwardly through the slots 19 and 15, which are long enough to compensate for the arc described by the bar 12 in its upward movement within the limits of a predetermined vertical adjustment. The limiting-yoke, coacting with the guide set forth, steadies the upward movement of the beams and planting attachment carried by the latter and obstructs straining of said beams, and it will be seen that when the arch of the yoke strikes against the under side of the bar 16 further upward movement of the beams and planting attachments will be obstructed, but during ordinary movements of the beams and planting attachments in conformity with irregularities or obstructions in the ground the center bar 12 will ride or vertically move through the openings 19 and 15 and the beams and planting attachments will be held in true position and overcome any tendency to strain the same by avoiding lateral movements thereof.

As a means of firmly bracing the wheel 3, as well as providing simple and effective means for forming a bearing for said wheel, a yoke 20 is employed, which is extended upwardly and forwardly at an angle of inclination from the wheel 3 and has a center hook 21 at its upper end caught over a triangular brace-rod 22.

The improved planting attachment will be found exceptionally convenient in carrying on planting operations, which will be pursued as in other cultivating and planting machines, and to accommodate different applications changes in the proportions, dimensions, and minor details may be resorted to without in the least departing from the spirit of the invention.

Having thus fully described the invention, what is claimed as new is—

1. The combination with a wheeled cultivator, of cultivator-beams movably mounted thereunder, a cultivating attachment carried by and movable with the said beams and including means for planting seed, a limiting-yoke connected to the rear extremities of the beams and attachment and having an upwardly-projecting center bar, and a slotted guide secured to and projecting rearwardly from the frame for loose engagement by the said center bar, said guide having a depending member.

2. The combination with a wheeled cultivator-frame, of cultivator means movably mounted below said frame, a cultivating attachment having planting means carried by the said beams, a guide secured to and projecting rearwardly from the frame and comprising a horizontal top bar having a slot in its rear extremity and a lower auxiliary bar parallel with the top bar and also having a slot in its rear extremity, and a yoke secured to the beam and having an upwardly-projecting center bar loosely movable through the said slots.

In testimony whereof I affix my signature in presence of two witnesses.

JOHN W. BENTON.

Witnesses:
C. F. WEIDEMAN,
L. B. DEMAREE.